April 9, 1946.  V. SHELTON  2,397,989
CHAIN LINK
Filed April 30, 1943
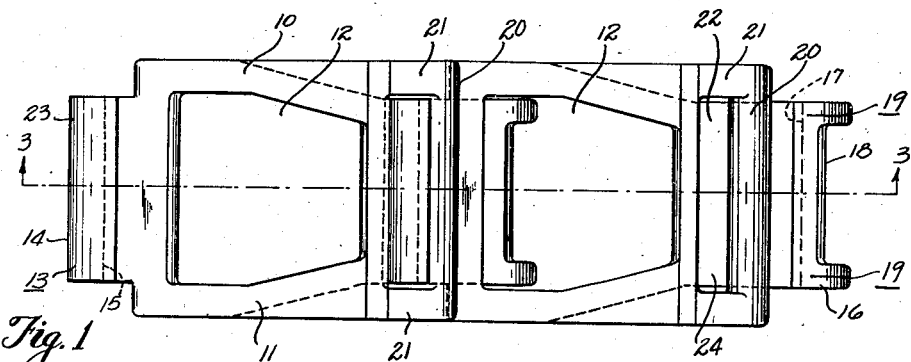
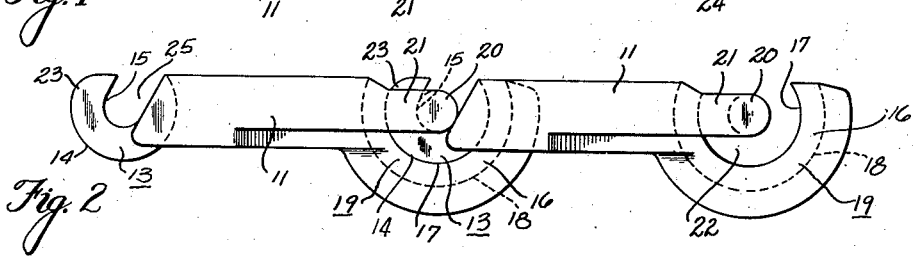
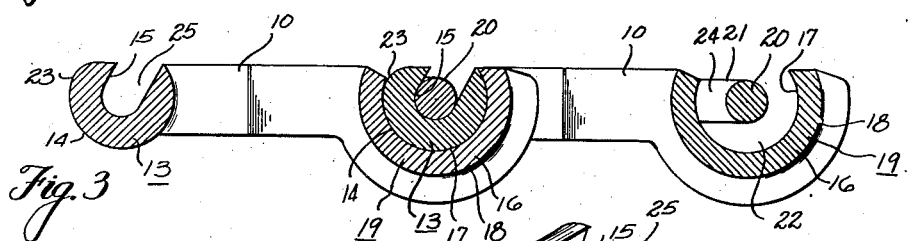
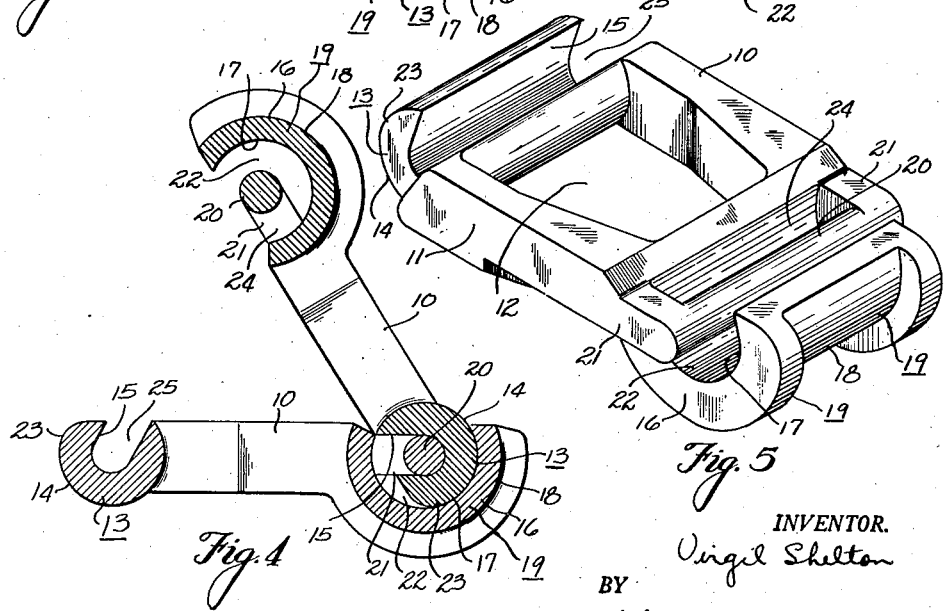
INVENTOR.
Virgil Shelton
BY
Woodling and Krost Patented Apr. 9, 1946

2,397,989

UNITED STATES PATENT OFFICE 2,397,989

CHAIN LINK

Virgil Shelton, Canton, Ohio, assignor to The Bowdil Company, a corporation of Ohio Application April 30, 1943, Serial No. 485,145

3 Claims. (Cl. 74—248)

My invention relates in general to chains and more particularly to chains arranged to engage sprocket teeth.

An object of my invention is a provision of a pivotal connection for adjacent links of a chain having a double set of hinged connected parts whereby the connection will withstand a great deal of wear and is made substantially twice as strong as a single pivotal connection for chain links.

Another object of my invention is a provision of a pivotal connection for adjacent links of a chain whereby the pivotal connection comprises an inner set of hinged parts and an outer set of hinged parts, the inner set of hinged parts preventing the pivotal connection from becoming disengaged, as well as carrying a portion of the load on the chain.

Further objects and a fuller understanding of my invention may be had by referring to the following description and claims taken in conjunction with the drawings in which:

Figure 1 shows a plan view of two adjacently connected links embodying the features of my invention;

Figure 2 is a side view of the two chain links shown in Figure 1;

Figure 3 is a cross-sectional view of the two links shown in Figure 1, taken along the line 3—3 thereof;

Figure 4 is a cross-sectional view similar to Figure 3 but with the links shown in a hinged position preparatory to disengaging the links; and Figure 5 is a perspective view of one of my chain links.

With reference to the drawing, the individual chain links are of the same construction and each link comprises generally two side elements 10 and 11 which have their ends bridged together by two transversely disposed hook means 13 and 19, the two hook means in combination with the side elements forming an open space 12 to receive the teeth of a sprocket wheel. The hook means 19 comprises a transversely disposed C-shaped hook portion 16 having an inner bearing surface 17 and a transversely disposed bearing bar 20 having an outer bearing surface spaced radially inwardly of the inner bearing surface 17 of the C-shaped hook portion 16. The transversely disposed bearing bar 20 has its end connected to the side elements of the link by means of side extensions 21.

The hook means 13 comprises a transversely disposed C-shaped hook portion 23 having an outer bearing surface 14 and an inner bearing surface 15. The outer bearing surface 14 and the inner bearing surface 15 engage respectively the inner bearing surface 17 and the outer bearing surface of the bearing bar 20 of the hook means 19. This pivotal connection between the adjacent links provides a double set of hinged connected parts whereby the construction will withstand a great deal of wear and is made substantially twice as strong as a single pivotal connection for chain links. The reference character 18 designates the outer surface of the C-shaped hook portion 16 which surface engages the sprocket wheel between the teeth thereof.

In disconnecting adjacent links, they may be swung to the position shown in Figure 4, whereupon the links may be moved laterally with respect to each other to disengage the same. The adjacent links may be connected in the reverse manner. In normal operation of the chain links, the nose of the C-shaped hook portion 23 is disposed in the space 24 between the bearing bar 20 and the inner surface 17 of the C-shaped portion 16. Consequently, the inner surface 15 of the nose of the C-shaped portion 16 engages the bearing bar 20 to make the inner set of hinged parts of the pivotal connection. The outer set of hinged parts comprise the bearing surface 14 engaging the socket defined by the bearing surface 17.

In disengaging the two links, they are moved to the position as shown in Figure 4 where the nose of the C-shaped hook portion 23 occupies the space 22 between the underneath side of the bearing bar 20 and the surface 17 of the C-shaped hook portion 16, thus permitting the nose of the C-shaped hook portion 23 to clear the side extension 21 as it is moved laterally with respect thereto. During the lateral movement of the links, one of the side extensions moves in the space 25 of the C-shaped hook portion 23. Also, in the position shown in Figure 4, the nose of the C-shaped hook portion 16, which in normal operation occupies a space between the side elements 10 and 11, clears the side elements, so that the adjacently connected links may be moved laterally for disengagement.

In a single pivotal connection, the chain links may come apart when the pivotal connection wears. In my construction, this is prevented by the bearing bar 20 which prevents the C-shaped hook portion 23 from becoming disengaged from the socket defined by the inner surface 17 of the C-shaped hook portion 16. Therefore, I have invented a pivotal connection for the links of a chain whereby the connection will stand a great deal of wear and is made substantially twice as strong as a single pivotal connection while at the same time, the presence of the bearing bar 20 prevents the hinged connection from becoming disengaged even though the parts may be worn considerably.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A chain link for a sprocket tooth, said link comprising side elements and hook means interconnecting the side elements and forming with the side elements an open space to receive the sprocket tooth, one of said hook means comprising a first transversely disposed C-shaped hook portion having an inner bearing surface and a transversely disposed bearing bar having an outer bearing surface spaced radially inwardly of the said inner bearing surface of the first C-shaped hook portion, the ends of said bar extending laterally beyond the C-shaped hook portion and being respectively connected to the side elements, the other hook means having a second transversely disposed C-shaped hook portion with an outer bearing surface and an inner bearing surface, said outer bearing surface and said inner bearing surface of the said second C-shaped hook portion being arranged to engage respectively the inner bearing surface of the first C-shaped hook portion and the outer bearing surface of the bearing bar of the next adjacent link.

2. In a chain having a plurality of links, the improvement of pivotal connection means for adjacent links, each said adjacent links having side elements, said pivotal connection means comprising first hook means interconnecting the side elements of one of the adjacent links and second hook means interconnecting the side elements of the other adjacent link, said first hook means comprising a first transversely disposed C-shaped hook portion having an inner bearing surface and a transversely disposed bearing bar having an outer bearing surface spaced radially inwardly of the said inner bearing surface of the first C-shaped hook portion, the ends of said bar extending laterally beyond the C-shaped hook portion and being respectively connected to the side elements, said second hook means comprising a second transversely disposed C-shaped hook portion with an outer bearing surface engaging the inner bearing surface of the first C-shaped hook portion and an inner bearing surface engaging the outer bearing surface of the bearing bar.

3. In a chain having a plurality of links, the improvement of pivotal connection means for adjacent links, each said adjacent links having side elements, said pivotal connection means comprising first hook means interconnecting the side elements of one of the adjacent links and second hook means interconnecting the side elements of the other adjacent link, said first hook means comprising a first transversely disposed C-shaped hook portion having an inner bearing surface and a transversely disposed bearing bar having an outer bearing surface spaced radially inwardly of the said inner bearing surface of the first C-shaped hook portion, the ends of the said bar extending laterally beyond the C-shaped hook portion and being respectively connected to the side elements, said second hook means comprising a second transversely disposed C-shaped hook portion with an outer bearing surface engaging the inner bearing surface of the first C-shaped hook portion and an inner bearing surface engaging the outer bearing surface of the bearing bar, said bearing bar preventing the second C-shaped hook portion from becoming disengaged from the first C-shaped hook portion.

VIRGIL SHELTON.